April 3, 1951  E. M. S. McWHIRTER ET AL  2,547,035
ELECTRIC SIGNALING SYSTEM
Filed Jan. 2, 1947   5 Sheets-Sheet 1

Inventors
ERIC M. S. McWHIRTER
ROLAND H. DUNN
PETER W. LENNOX
By Robert Harding Jr.
Attorney

Patented Apr. 3, 1951

2,547,035

UNITED STATES PATENT OFFICE 2,547,035

ELECTRIC SIGNALING SYSTEM

Eric Malcolm Swift McWhirter, Roland Harris Dunn, and Peter William Lennox, London, England, assignors to International Standard Electric Corporation, New York, N. Y.

Application January 2, 1947, Serial No. 719,773
In Great Britain February 5, 1946

6 Claims. (Cl. 177—351)

1

This invention relates to electric signalling systems and has for its object an improved method of remote indication of the conditions of electric circuits.

The main feature of the invention comprises a circuit for translating an electric value into a teleprinter code.

The invention enables conditions at an unattended station to be teleprinted at regular and closely-spaced intervals to an attended station where a permanent record can be printed.

The invention will be particularly described in relation to certain of its many possible embodiments shewn in the accompanying drawings in which:

Figs. 5 to 8 are alternatives to one another.

Fig. 9 shows an automatically operable potentiometer circuit for applying a range of D. C. reference potential to one of the comparison circuits, and means for controlling the transmission of a teleprinter code in accordance with the setting of the potentiometer when the comparison circuit operates, while

For the purpose of carrying out the invention it will be described how the various electrical values, which are required to be translated into teleprinter codes, are first transformed into corresponding D. C. voltages. These voltages are fed to a comparison circuit which on operation of a key compares them in turn with individual D. C. reference voltages from a plurality of such reference voltages which are available. The comparison circuit is arranged to operate first of all when a roughly equal reference voltage is applied to it. This operation results in the connection to the comparison circuit of a further plurality of D. C. reference voltages, the difference between adjacent voltages of this further plurality being much smaller than exists between adjacent voltages of that previously applied. A fine adjustment then automatically takes place, the comparison circuit operating again when two voltages applied to it are much more close to equality. The second operation of the comparison circuit results in the positioning of a switch on terminals indicative of the reference voltage which has been chosen as most closely corresponding to that resulting from the transformation into a D. C. voltage of the particular electrical value which it is desired to translate into a teleprinter code. It is the positioning of the switch, whereby circuits are completed for appropriate digit codings, which results in the transmission of the teleprinter code.

Various transforming circuits and several alternative comparison circuits together with the circuit for provision of reference voltages and operation of the positioning switch, will now be described in some detail.

In general, the invention provides a method of converting either D. C. voltages or A. C. voltages of different amplitudes into coded impulse combinations, for example those of the 5-unit teleprinter code; so that the various signal levels can be transmitted to a distance and reproduced by conventional printing telegraph apparatus.

Figure 12:
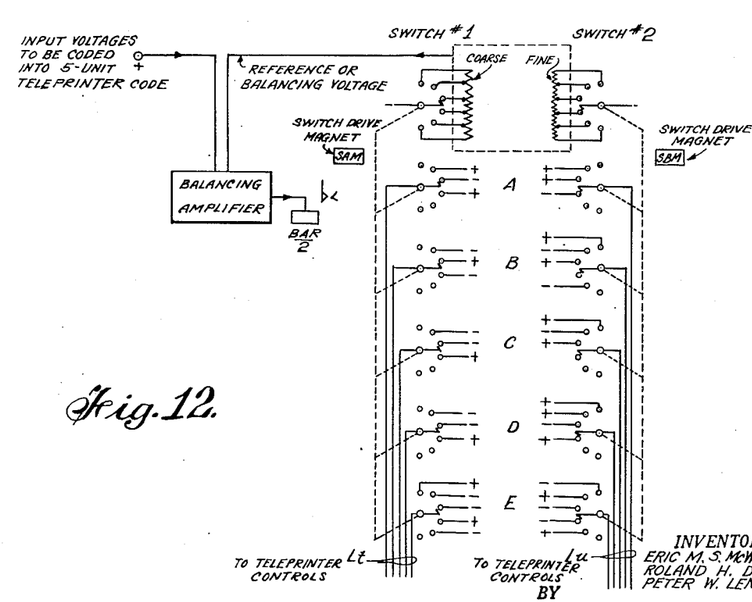
Fig. 12 is a generalized schematic diagram explanatory of the principle of the invention.

Fig. 12 shows in generalized schematic form, the more important parts of a system according to the invention. Thus the input voltages to be coded are applied to a balancing amplifier, together with a reference voltage whose magnitude is automatically adjusted under control of two automatic switches such as are conventionally used in automatic telephone switching systems. Switch #1 controls a "coarse" potentiometer and switch #2 controls a "fine" potentiometer. The potentiometer resistances are tapped to the fixed or bank contacts of the respective switches, and the wipers of these switches are arranged to be moved over their respective bank contacts until the reference voltage applied to the balancing amplifier equals the input voltage to be coded. The operation of the automatic potentiometer adjusting switches and the balancing of the amplifier are effected mutually and automatically.

When the amplifier has become balanced, a relay BAR in the output of the amplifier releases, and stops further operation of the automatic switches. Each of the switches has additional levels of bank contacts A, B, C, D, E, and respective wipers, the latter being connectable to a line so as to apply to the line successive code combinations of opposite polarity impulses which combinations are determined by the automatic setting of the said switches. It will be understood, of course, that the various bank contacts of the levels A, B, C, D and E of switch #1 are connected to suitable positive and negative potentials so that the particular potentials which are applied to the five conductors $L_t$ represent the coded combination of the tens digit of the desired input voltage level to be coded. Likewise the five wires $L_u$ will have various combinations of positive and negative potential applied thereto determined by the position of the wipers of switch #2 on their respective bank contacts A, B, C, D and E and corresponding to the units digit of the said input voltages to be coded. These combinations of coded impulses then can be transmitted to any suitable recording machine which operates on the teleprinter or coded impulse combination type. Preferably, however, they are connected to the bank contacts of a third automatic switch for the purpose of sending sequentially the various code impulses over a single 2-conductor line as will be described in connection with Fig. 11.

Figure 1:
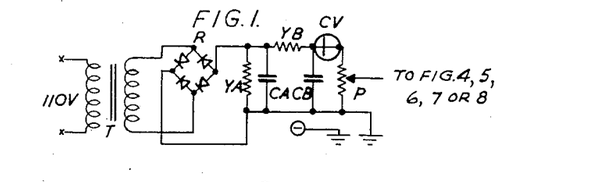
Fig. 1 shows a circuit for translating A. C. volts into D. C. volts preparatory to translation to teleprinter code.

In Fig. 1 a transformer T is connected to the circuit carrying the potential to be measured at a convenient point and provides a suitable input for a full-wave rectifier R which can be a metal rectifier or an arrangement of valve rectifiers with smoothing elements consisting of resistance YA, YB and condensers CA, CB delivering a D. C. voltage to a potentiometer P which is used to adjust a full scale reading. A stabilizing valve CV may, or may not, be used. Its purpose is to subtract from the output of the rectifier circuit a constant D. C. voltage which gives zero suppression, a facility frequently required on voltage measuring.

Figure 2:
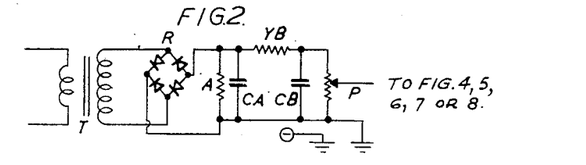
Fig. 2 shows a circuit for translating A. C. amperes into D. C. volts.

The current transforming circuit shown in Fig. 2 is similar to the voltage circuit in Fig. 1, the transformer being a current transformer arranged to deliver a suitable output voltage. The zero suppression has been omitted as this feature is seldom required on current readings.

Figure 3:
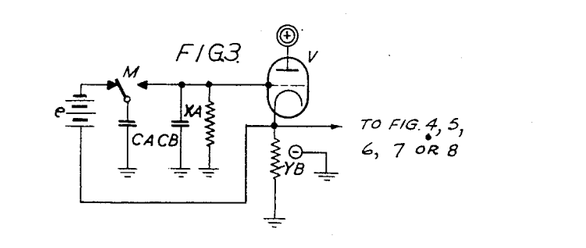
Fig. 3 shows a circuit for translating the rate of operation of the change-over contact of a kilowatt hour meter into D. C. volts.

The circuit for kilowatt translation shown in Fig. 3 is fundamentally different and is based on obtaining the reading from a kilowatt-hour meter such as is normally part of power station equipment fitted with a change-over contact which normally exists for the printometer circuit. The change-over contact M charges condenser CA from battery $e$ in the position shown and discharges CA into CB in its other position. CA is a small condenser and CB is a large condenser. Condenser CB has a leak resistance XA and the voltage across condenser CB arrives at a stable figure when the quantity which leaks away through XA between impulses equals the quantity put in by CA on each impulse. To obtain linearity it is necessary that CA should always supply the same quantity. It should therefore always be charged to a voltage which is $e$ plus the voltage on CB. Condenser CB feeds the grid of valve V which is arranged as a cathode follower. Resistor YB provides a cathode voltage normally equal to the grid voltage. This cathode voltage and supply $e$ are connected in series. Supply $e$ is shown as a battery but would normally be a small rectifier circuit.

Linear output is obtained only if the cathode voltage exactly equals the grid voltage. This can be obtained for all practical purposes by making the cathode follower V a high gain amplifier. If the ratio between the cathode voltage and the grid voltage is $k$, a similar result can be obtained by discharging condenser CA to $k$, the grid voltage, this can be effected by connecting CA to a suitable tapping point on YB as shown in Fig. 3a.

Figure 4:
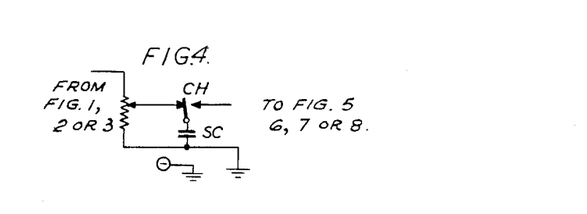
Fig. 4 shows a circuit for smoothing fluctuating D. C. voltages from the circuits of Figs. 1–3.

The D. C. voltage obtained across YB is applied to the comparison circuits.

Where the system is being used to give readings of fluctuating loads it is necessary to freeze the reading so that it remains constant during the time taken to translate into code. The circuit shown in Fig. 4 enables a condenser SC to be charged from the output voltage from the circuit of Fig. 1, 2 or 3, via back contact CH, and then via front contact CH, to be applied to the comparison circuit. Since the comparison circuit is an infinite input resistance this arrangement is sufficient.

Figure 5:
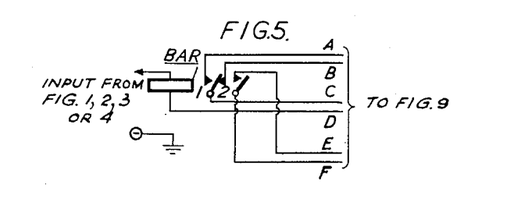
Fig. 5 shows a simple comparison circuit for comparing the D. C. volts from any one of Figs. 1–4 with a range of reference voltages.
Figure 6:
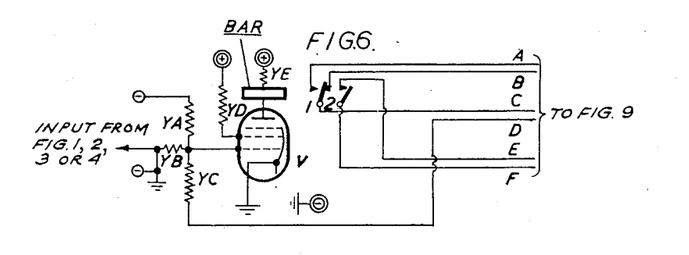
Fig. 6 shows a pentode comparison circuit.

The function of the comparison circuit has already been briefly stated. The unknown input voltage is compared in turn with a number of available reference voltages. The application of a reference voltage equal to the input voltage, results in the transmission of a teleprinter code corresponding to the value so determined. The comparison circuit therefore requires to be stable and to give a discrimination better than one part in a hundred. The circuit shown in Figure 5 in which a sensitive differential relay is used cannot be made to give the accuracy required but can be used for the less pretentious type of circuit. The circuit shown in Fig. 6 uses an amplifying valve V to operate a relay BAR. In this case the input voltage is applied first and makes the grid of the valve negative well beyond anode current cut-off. The reference voltage REF is then increased in steps until the valve commences to pass anode current and finally operates relay BAR. The valve requires a short grid base in comparison with the input and reference voltages and can consist of a D. C. amplifier of more than one stage. Suitable resistances YA—YE are provided.

The expression "grid base" used in the preceding paragraph, refers to the range of grid voltages between that required to cut off anode current on the one hand, and that required to produce the maximum anode current which the valve can pass on the other hand for any given anode voltage condition. A valve with a short grid base is one having only a small difference for these two extreme grid voltages.

Figure 7:
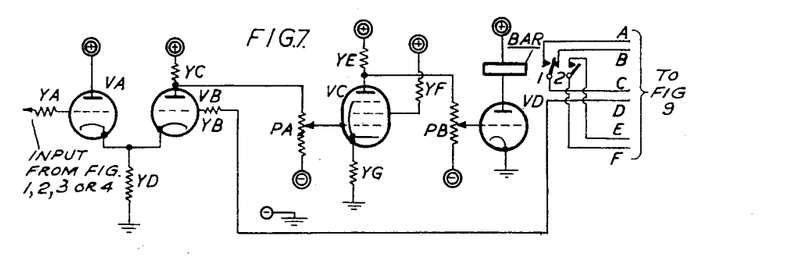
Fig. 7 shows a balancing amplifier for comparison purposes.

Fig. 7 shows a balancing amplifier 4 and this is the arrangement which at present we prefer. The input and the reference voltages are applied to the grids of two valves VA and VB which have a common cathode load resistance YD. The valves therefore operate as cathode followers and the valve with the higher positive grid potential passes all the anode current. If the grid potentials are arranged gradually to become equal, the anode current is shared between the valves; as the grid potentials diverge, the current swings to one side. This gives a rapid discrimination as the reference voltage approaches the input voltage. A two stage D. C. amplifier comprising valves VC and VD is used between the cathode followers and the relay BAR, a potentiometer PA, PB being used to feed each stage of said amplifier. Suitable load, bias and dropping resistances YA, YB, YC, YE, YF, YG are provided for the valves VB, VC and VD.

It should be noted that this circuit requires a power supply providing three connections, positive, earth and negative, and a pair stability is required in the ratio between the positive and negative sides. This is an easy requirement to meet with electronic stabilisation.

Figure 8:
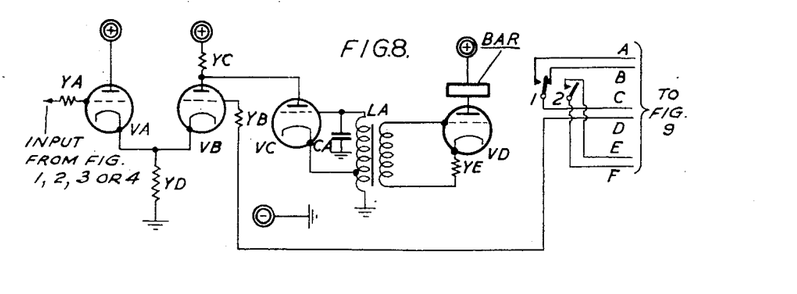
Fig. 8 shows a modified balancing amplifier circuit.

Fig. 8 shows an arrangement similar to Fig. 7 in which the cathode follower controls an oscillator valve VC so that oscillation starts as the reference voltage approaches the input voltage. When valve VB is conducting, the voltage drop across resistance YC reduces the anode potential available to valve VC, thereby preventing oscillation thereof. However, as soon as VB cuts off, the anode potential of VB rises and valve VC receives sufficient anode potential to commence oscillating. The A. C. generated by the oscillator is then amplified and operates relay BAR via an amplifying valve VD. Valves VC and VD are coupled by means of transformer LA. This circuit is included as it avoids the D. C. amplifier and the necessity for the stabilised supply.

Figure 9:
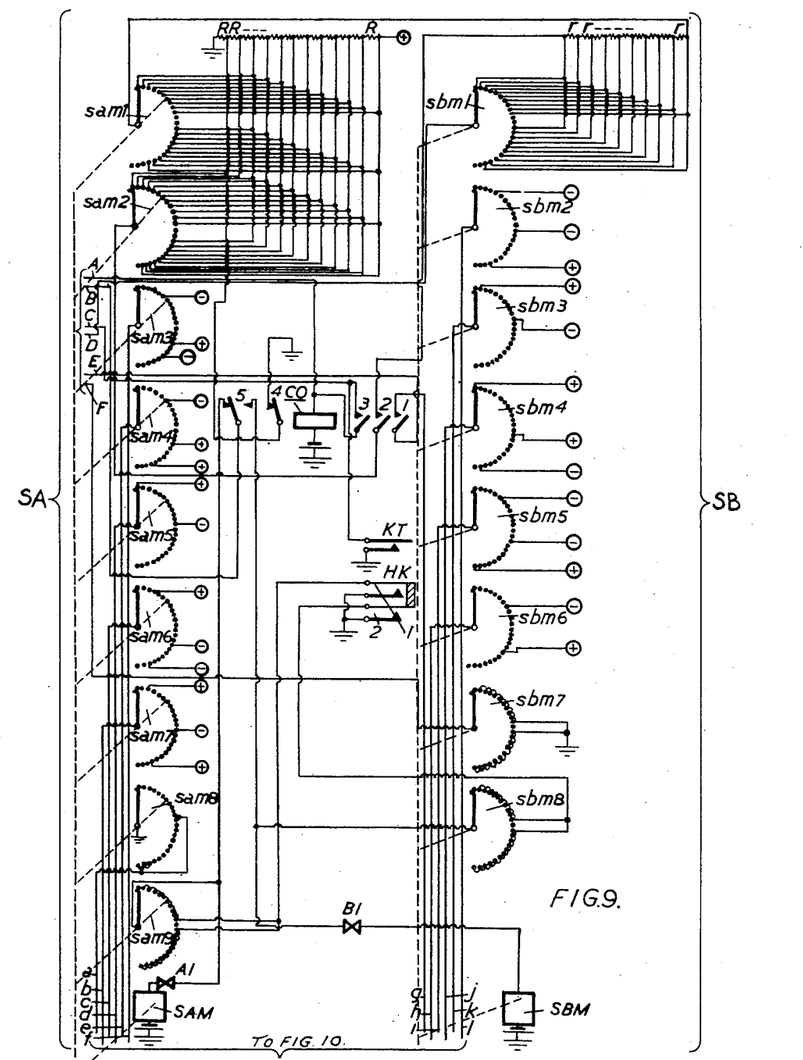
Figure 10:
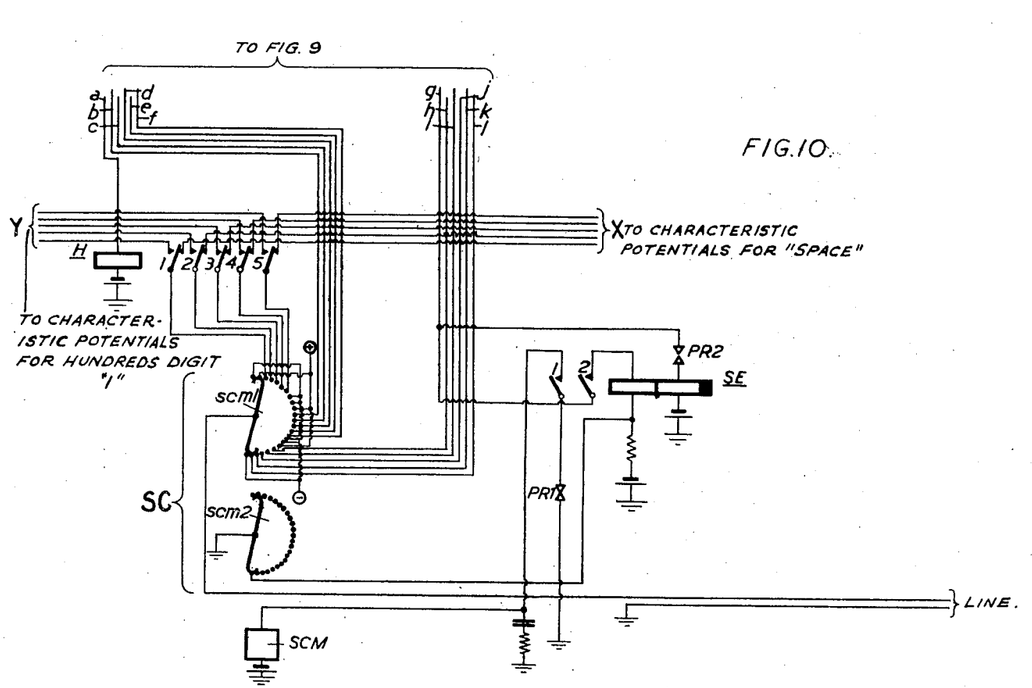
Fig. 10 is a simplified form of Fig. 9 to explain the potentiometer arrangement more clearly.

Figs. 9 and 10 show the balancing coder. A stabilised reference voltage which is 110% of the input voltage to the comparison circuit corresponding to a full-scale reading, is applied to resistances R forming a potentiometer connected to the contacts of one bank of a switch SA, and the voltage is tapped off this potentiometer and supplied as the reference voltage to the balancing amplifier, Fig. 7 or 8. Switch SA takes steps along its potentiometer bank contacts so as ultimately to control the setting up of the first tens digit of the code, and it stops on the contact next above the correct first digit. This stopping is effected by the relay BAR in the balancing amplifier (Fig. 8) a contact $bar1$ of which is shown in the coder circuit, acting as a trip for the switch driving magnets SAM and SBM. Relay BAR when it attracts its armature to close with its right hand contact (Fig. 9), as well as stopping the switch by opening the energizing circuit of switch driving magnet SAM, operates a relay CO which connects a fine potentiometer consisting of a series of "fine" resistors $r$ on switch SB over a contact $co2$ and $sam2$ across two sections of the coarse potentiometer of switch SA, between the point at which the switch SA has been tripped and two steps further back. Potentiometer resistances R (comprising eleven sections) are connected between the bank contacts of level $sam1$ of switch SA in such a manner, that the first contact of $sam1$ is connected between the second and third section of resistances R; the second contact of $sam1$ is connected between the third and fourth section of resistances R; the balance of the contacts being similarly connected to succeeding sections of the resistances R, until eleven contacts have been so connected. The same connections are duplicated in the second half of the 25 point switch $sam1$ so that even use is made of all bank contacts. An additional resistance RR is serially connected between the low potential end of potentiometer R and ground. The first contact of level $sam2$ is connected to the junction point of resistance RR and the potentiometer R. The second contact of level $sam2$ is connected between the first and second section of the potentiometer resistances R, and the third contact of level $sam2$ is connected to the first contact of level $sam1$. The fourth contact of level $sam2$ is connected to the second contact of level $sam1$, and so on. It will thus be seen that the connections between levels $sam1$ and $sam2$ are effectively staggered by two, and the wiper of level $sam2$ is always two steps behind the wiper of level $sam1$ along the potentiometer resistances R. This reduces the value of the two steps from 2R to R and an additional resistance R is inserted at the bottom end of the potentiometer to make the total resistance correct. Since the wiper of switch $sbm1$ starts at the beginning of its potentiometer, this switching has effectively brought the potential down by one tens step, to balance the fact that switch SA trips on the step beyond the correct point. Switch SB will then hunt and trip on the next unit step.

If the reading is 85% of the input full-scales reading, switch SA will run to a point corresponding to 90% of the reference voltage whereupon it stops. The insertion of switch SB will reduce the 90% to 80% and switch SB will run to the 85% point.

The switches carry other levels to mark the teleprinter sender, and according to the strapping can mark any characters required. This operation will later be explained with reference to Figs. 9 and 11.

It is proposed to use more than 10 sections on switch SA so that normal full load readings will be figures approaching 100 per cent, and over-load readings will give figures exceeding 100 per cent. The setting of switch SA can be used to mark both the hundreds digit when required and the tens digit. The appearance of a 3 digit number instead of a 2 digit number on the printed record draws attention to the incidence of over-load. The manner of producing the third digit of the code will be explained below.

The potentiometer shown in Fig. 9 comprises two single motion step by step wiper switches SA, SB of the kind used in automatic telephony, the switches being used for coarse and fine adjustment respectively, incorporating in well known manner stepping magnets SAM, SBM, stepping interrupters AI, BI, contact banks and co-operating wipers $sam1$ ..., $sbm1$ ....

The only other equipment in the potentiometer consists of an electromagnetic contact-making relay CO also of the kind used in automatic telephony, and controlling five sets of contacts, three normally-open pairs of contacts $co1$, $co3$, one normally closed pair $co4$, and change-over contacts $co5$, a test key KT, a homing key HK1, 2, and change-over contacts $bar1$ of a test relay BAR such as that associated with the balancing amplifier test device (Fig. 8).

Potentiometer resistances R are connected between the bank contacts of level $sam1$ of switch SA. It will be seen that the complete coarse potentiometer consists of 11R, two below the normal positions of $sam1$ and nine between consecutive contacts of $sam1$. The bank contacts of $sam2$ are cross-connected to bank contacts of $sam1$, the cross-connections being staggered by two contacts so that in effect, so far as the R potentiometer is concerned, wiper $sam2$ is two steps behind $sam1$. The potentiometer connections are duplicated in the second half of the 25 point switch.

The fine potentiometer comprises ten resistances $r$, such that $5r=R$. Nine of the resistances $r$ are connected between bank contacts of $sbm1$, with the tenth in series between the other nine and wiper $sam1$. The lower end of the fine potentiometer is connected independently of wiper *sbm 1* via a normally open contact *co2* to wiper *sam 2*. Earth is connected via a resistance RR shunted by normally-closed contacts *co1* to the lower end of the coarse potentiometer while battery is connected to the upper end thereof. Wiper *sbm 1* is connected to the balance amplifier of Figs. 7 or 8 to provide the reference voltage. The eleven coarse resistances R allow the potentiometer to record any percentages up to 110%. It will be clear of course that this range can be extended by employing a greater number of coarse resistors.

Wipers and banks *sam 3*, *4*, *sbm 2* indicate the percentage setting of the potentiometer as a whole, *sam 4* giving a hundreds digit 1, when the reading is 100% or over, *sam 3* gives the tens digit, and *sbm 2* the units digit. The eleven resistances R allow the potentiometer to record in percentages up to 110%; thus could of course be extended.

The appearance of the hundreds digit can be used as an indication of overload of the electric circuit under examination and whose condition is being remotely indicated. If the potentiometer is to control the transmission of the percentage of the full-scale value by teleprinter code, contacts of other levels of the said switches SA and SB will be connected, as shown in Fig. 10 for instance. Only one possible method of code sending is contained in the following description and indicated in the drawing, but use may also be made, for example, of the teleprinter code sending equipment described in United States Patent No. 2,433,362.

With test key KT thrown and the balance amplifier contact *bar 1* in the position shown the stepping circuit for magnet SAM is closed, and wipers *sam 1*, 2 etc. are stepped upwards. Reference potential is connected to the balance amplifier comparison circuit between wiper *sam 1* and earth. The *sam 1* connection to the amplifier is via the fine potentiometer but this has no appreciable effect as the grid of amplifier valve VD takes no current.

When *sam 1* has passed resistances sufficient to raise the reference voltage above the voltage under comparison, and wipers *sam 1*, 2 are, for instance, on the 7th contact position shown in Fig. 9 valve VD is caused to conduct; (Fig. 6, 7 or 8) and thereby the amplifier relay BAR operates change-over contacts *bar 1*, which open the stepping circuit of SAM and energise relay CO which locks via *co3*. Contacts *co2* close connecting wiper *sam 2* to the bottom of the fine potentiometer so that, as will be clearly seen from Fig. 9, the fine potentiometer of $10r=2R$ is connected in parallel with the 2R portion of the coarse potentiometer between *sam 1* and *sam 2*, giving a resultant resistance of R. At the same time, contacts *co4* introduce another R into the coarse potentiometer.

The result is as follows: wiper *sam 2* is now the effective tapping point on the SA potentiometer, and its introduction has increased the resistance above the new tapping point (referred to the potentiometer) by R, the resultant resistance of 2R in parallel with $10r$. The overall resistance of the potentiometer has been maintained by introducing the additional R at the bottom of the coarse potentiometer in the manner described above.

Due to the effective reduction in the potential via *sbm 1* to the balance amplifier the relay BAR in the latter has released, and contacts *bar 1* return to normal. As relay CO is locked via *co3*, KT a circuit is closed for switch stepping magnet SBM, so that wiper *sbm 1* is stepped along the fine potentiometer. As previously stated, no current is required to flow via the potentiometer circuit, so that the ten equal resistances r give ten equal increments of potentials, each one-tenth of the increment given by a step of the coarse potentiometer. When the reference potential equals or exceeds the potential under comparison, contacts *bar 1* are again operated, stopping switch SB so that the setting of switches SA, SB now indicate the percentage comparison between the reference voltage and the voltage under comparison.

It has already been indicated how the potentiometer reacts to an 85% required voltage and it will be clear that although there is originally 20% of the available 110% reference voltage (referred to full-scale input to the comparison circuit) below the first terminal this position of the wiper must result in the printing of the tens digit "1."

It will be seen that if the voltage under comparison is less than 20% of the maximum reference potential, SA will not step, but CO will be immediately operated and the potential connected to *sbm 1* will be reduced to 10% value. Provided the voltage under comparison is between 10% and 20%, SB will start stepping.

The circuit is not designed to evaluate voltages of less than 10% value, although this could of course be done by arranging that when the test circuit (i. e. Figs. 1, 2 and 3) is in its zero indicating condition the comparison circuit is balanced. This may in some circumstances be done by raising or lowering the reference level of the output from the test circuit.

The first terminal contacted by the wiper *sbm 1* is responsible for the printing of the teleprinter code representing the units digit "0." The tenth and eleventh will both print "9." This is necessary because if the input voltages to the comparison circuit are between, say, 39% and 40% of the full-scale reading (or 49% and 50% etc.) the following operation must take place. SA will first step to the third terminal, i. e. the one at which 40% of the input voltage is tapped and which marks a ten digit of "3." The various operations already detailed then take place and SB steps. At the tenth terminal the reference voltage will still not be sufficient to operate the comparison circuit relay BAR for although this is the terminal normally responsible for printing "9" the input voltage now being applied to the comparison circuit is greater than "39" but less than "40." SB steps to the eleventh terminal therefore, the voltage is now sufficient to trip BAR but it is arranged for this terminal also to print the units digit "9." The 39–40% indication is now able to be correctly coded.

It will be seen that common test means serve both the coarse and fine potentiometers in turn without modification, modification taking place within the potentiometers to allow for automatic adjustment of both potentiometers in turn.

The method of translating the positioning of the potentiometer wipers, which takes place automatically once the key KT has been operated, will now be explained with reference to Figs. 9 and 11. The operation of the potentiometer level of the switches SA and SB will also of course have positioned *sam 3* ... 8 and *smb 2* ... 6. The terminals on all these levels except *sam 8* have either positive or negative polarities on them so providing the five potential code for both tens and unit digits. Any setting of SA and SB therefore is transferred to a binary coding over these levels and placed on five wire sets which pass to the terminals of another automatic telephone type switch SC on its level *scm*1. Referring back to the eighth level *sam*8 of the switch SA we see that to certain terminals are arranged to complete a circuit for a relay H. These terminals correspond to the positions at which the potentiometer value to be transmitted contains three figures, i. e. is 100% or over of the full-scale indication.

Figure 11:
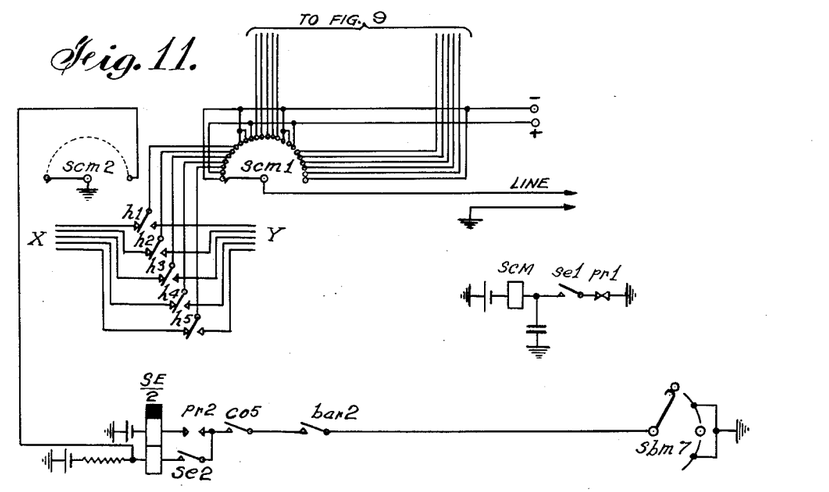
Fig. 11 shows the means for controlling the transmission of a teleprinter code in accordance with the setting of the potentiometer when the comparison circuit operates.

Looking now at Fig. 11 it will be seen that the relay H has five change-over contacts *h*1 . . . *h*5. Normally the circuit X, giving the characteristic code potentials for a space are connected through the change-over contacts to *scm*1 terminals but the operation of relay H connects the circuit Y thereto so arranging for the sending of the hundreds unit "1."

A pendulum relay, or other timing means, is provided for timing the code sending and this has two contacts *pr*1 and *pr*2 one normally closed whilst the other is open.

When the comparison circuit has completed its operations *bar*2 and *co*5 are closed and *sbm*7 is in an off-normal position. Providing *pr*2 is closed therefore SE will operate and lock over *se*2. On the next closure of *br*1 following the closure of *se*1 the magnet SCM will be energized and SC will step on each subsequent opening of *pr*1. The wiper *scm*1 then scans its terminals finding thereon the coded representation of the value which is to be transmitted to the line together with the inter-digit polarities which it is standard practice to send. After completing its travel SC completes a circuit over *scm*2 for the unlocking of the relay SE so providing for the release of SC and its return to its home position.

With SC standing again in its home position key KT may be restored, releasing CO whilst over HK1 and *sam*9 and HK2 and *sbm*8 SA and SB may be stepped to their next home positions. A circuit may be arranged for this restoration to be carried out automatically or it may be done manually, say in response to an indicating lamp showing the return of SC to its home position after transmitting the teleprinter code.

What is claimed is:

1. A system for converting input electric signals of different energy content into telegraph code signal combinations comprising a source of telegraph code potential; an outgoing line, a source of reference potential in graduated steps; means for comparing said input signals with said reference potential including a balancing network, said network, comprising grid-controlled electron discharge means, said discharge means having a short grid base in contrast to the range of energy content of the input signals to be compared, means for applying said input signals to said discharge means in a direction to prevent the flow of space current in said discharge means, first switch means of the plural contact, plural bank type, having different of the contacts of selected of said banks connected to different of the steps of said reference potential, and different of said banks having selected contacts thereof connected to said code potential in a predetermined polarity sequence, said first switch means under control of said discharge means and adapted to sequentially apply different steps of said reference potential to said discharge means in a direction opposite to said input signals, additional switch means for sequentially scanning said different contact banks of said first named switch means, said additional switch means coupled between said first named switch means and said line whereby said code combinations are applied to said line, to indicate the varying energy content of said input signals.

2. A system as claimed in claim 1, wherein said balancing network further comprises a plural section potentiometer, said potentiometer connected in shunt across said source of reference potential and wherein, the different contacts of said selected contact banks of said first named switch means are connected to different sections of said potentiometer in a predetermined sequence.

3. An electrical signalling apparatus, as claimed in claim 1, wherein said electron discharge means comprises two grid-controlled electron discharge valves having a common cathode load resistor, means for applying said input signals to the grid of a first one of said valves in a positive sense, means for applying the reference voltage to the grid of said second valve over said first named switch means, relay means connected to the output of said second valve, said relay adapted to be responsive when the reference voltage equals the energy content of said applied input signals, said first named switch means under control of said relay means, whereby operation of said switch means is halted when said reference voltage equals the energy content of the input signals applied to the grid of said first valve.

4. A system as claimed in claim 3 wherein said comparing means includes a second plural section potentiometer and said first switch means comprises a pair of switches of the plural contact, plural bank type, having plural cooperating wipers therefor the first of said pair of switches having different of the contacts of selected banks thereof connected to different of the steps of said reference potential, the second of said pair of switches having different of the contacts of a selected bank thereof connected to different of the sections of said second potentiometer, the wipers of the selected banks of the first of said pair of switches connected to opposite ends of said second potentiometer, the wiper associated with the selected bank of the second of said pair of switches connected to the grid of said second valve, and said relay means connected to the output of said second valve comprises a two position electromagnetic relay, said relay adapted selectively to control the operation of a different of said pair of switches in each position of said relay.

5. A system as claimed in claim 1, wherein said means for applying said input signals to said discharge means includes means for rectifying the alternating current component of said input signals.

6. A system as claimed in claim 1 wherein said electron discharge means further comprises a further electron discharge valve, a resonant circuit coupled to said last-named valve, means to couple said last named valve to said comparing means, said valve adapted to remain in normally non-oscillating condition, and means for causing said last named valve to oscillate when the potential from said reference source approximates the energy content of the input signals applied to said comparing means and means coupled to said last-named valve to control operation of both said switch means.

ERIC MALCOLM SWIFT McWHIRTER.
ROLAND HARRIS DUNN.
PETER WILLIAM LENNOX.

REFERENCES CITED

The following references are of record in the file of this patent:

UNITED STATES PATENTS

| Number | Name | Date |
|---|---|---|
| 1,602,882 | Chubb | Oct. 12, 1926 |
| 1,778,827 | Evans | Oct. 21, 1930 |
| 2,110,015 | Fitz Gerald | Mar. 1, 1938 |
| 2,207,744 | Larson | July 16, 1940 |
| 2,217,477 | Gulliksen | Oct. 8, 1940 |
| 2,237,713 | Russell | Apr. 8, 1941 |
| 2,241,743 | Schoene | May 13, 1941 |
| 2,432,826 | Smith | Dec. 16, 1947 |

FOREIGN PATENTS

| Number | Country | Date |
|---|---|---|
| 266,798 | Great Britain | Feb. 28, 1927 |